Patented Jan. 21, 1936

2,028,715

UNITED STATES PATENT OFFICE 2,028,715

FIRE RESISTANT COMPOSITION

Ernest R. Hanson, Bloomfield, N. J., assignor to Halowax Corporation, New York, N. Y., a corporation of Delaware No Drawing. Application April 27, 1931, Serial No. 533,371

16 Claims. (Cl. 134—78.6)

This invention relates to a material for impregnating and treating textiles, paper and the like in order to render them incombustible and fire resistant, and to the articles thus treated, as well as to a method of flame-proofing such articles.

Chlorinated naphthalenes particularly the normally wax-like products have previously been applied to different combustible articles such as wood or fabric to render the articles more or less flame-proof to the extent that if a flame is applied directly to the material, the chlorinated naphthalene prevents the material from supporting combustion. When articles such as the fabric covering of a wire, however, are fireproofed with these chlorinated naphthalenes the difficulty is encountered that when bent, as almost always occurs in use, the chlorinated naphthalene cracks and flakes off under the distortion, with the result that the flame-proofing loses its effectiveness.

The general object of the present invention is to overcome the difficulties which have heretofore been inherent in the use of the highly halogenated cyclic compounds of the chlorinated or brominated naphthalene or anthracene types, such as the cracking of such flame resisting materials because of their crystalline nature. These difficulties have been overcome according to the present invention by adding to a flame-proofing compound of this nature a plasticizer, that is, a substance miscible with or a solvent for these crystalline halogenated compounds, which is preferably an amorphous or resin-like ring type material and more specifically and preferably a halogenated derivative of diphenyl, acenaphthene or phenanthrene. While these products when chlorinated or otherwise halogenated sufficiently, are recognized as flame-proofers in themselves they are now found to be plasticizers for the crystalline chlorinated naphthalenes, anthracenes, etc. with the highly desirable and useful result that, if the required proportion of such a plasticizer is used with the crystalline type of halogenated cyclic compound, the composition is flexible enough so that it does not crack or rupture when the article to which it is applied, is bent or otherwise distorted. This is particularly desirable because the halogenated cyclic compounds of the crystalline type, particularly the chlorinated naphthalenes, are excellent electrical insulating materials as well as flame-proofers, and if cracking is prevented, the article which is impregnated with the composition is not only rendered more fireproof but no cracks occur through which moisture may enter the fabric and form a path through which current can leak from the central wire or core. The use of a plasticizer with the crystalline halogenated cyclic compounds therefore gives an impregnating composition which is an improved electrical insulator, as well as flame-proof substance.

These and further objects and features of the invention will more fully appear from the following claims taken in conjunction with the description, which, however, must be construed as merely illustrating and in no way limiting the invention to the embodiment to be described.

The basic ingredient of the impregnating composition is a halogenated cyclic compound such as naphthalene or anthracene which is halogenated in any desired manner by one or more of the halogens. One of the most familiar halogenated cyclic compounds is known under the trade name of Halowax, which is a chlorinated naphthalene principally tri, tetra, penta and hexachlor, but may include higher and lower chlorinated compounds. Other halogenated cyclic compounds, such as halogenated anthracene, may be used. These may be halogenated with only one of the halogens or may be halogenated with a plurality thereof, for instance naphthalene or anthracene may be halogenated with chlorine or bromine or with both chlorine and bromine. Bromine is a better fireproofing agent than chlorine but at present is regarded as too expensive for general use; but as less material is necessary and therefore a thinner coating may be used with the same fireproofing effect, the brominated cyclic compounds can be used at approximately the same or less cost than the chlorinated compounds. Iodine is a better fireproofing agent than bromine but at the present time its cost is prohibitive. In general, the higher these cyclic compounds are halogenated the more resistant they are to fire, and they have higher melting points than cyclic compounds which are not so highly halogenated. These halogenated derivatives of the cyclic compounds, such as naphthalene and anthracene, as before stated are crystalline substances; when the fabric, paper, etc. which is impregnated with these substances, is bent or otherwise deformed, the impregnating material tends to crack along the crystal faces, and this cracking is undesirable for the reasons previously explained.

The plasticizing agents, that is, substances that are miscible with or soluble in the aforesaid base material, in accordance with this invention are the halogenated resin-like derivatives of cyclic organic compounds such as diphenyl, acenaphthene and phenanthrene which are excellent plasticizers for a crystalline halogenated cyclic compound. When halogenated, these substances are not only plasticizers but also flame-proofing materials. They have the plasticizing property of preventing the cracking, flaking or breaking of an impregnating composition that includes a halogenated cyclic compound of the crystalline type. These chlorinated or otherwise halogenated compounds of diphenyl, acenaphthene, phenanthrene are syrupy, viscous liquids or amorphous resin-like solid bodies depending upon the degree of halogenation. When added to the crystalline chloronaphthalene or other halogenated cyclic compound, they yield very excellent flexible impregnating compositions which are also fireproof in that they do not support combustion. Thus by the use of these plasticizers advantage is taken not only of their plasticizing but also of their flame proofing characteristics.

The following are formulæ for several impregnating materials which have given satisfactory general use, all of the material having excellent flame-proofing characteristics and flexibility:

1—100 parts chloronaphthalene (45–50% chlorine)
    8 parts chloro-diphenyl (65% chlorine)
2—100 parts chloronaphthalene (62–67% chlorine)
   10 parts chloro-diphenyl (65% chlorine)
3—100 parts chloronaphthalene (52% chlorine)
    5 parts chloro-diphenyl (65% chlorine)
    1 part chloro-diphenyl (54% chlorine)
4—100 parts chloronaphthalene (62–67% chlorine)
   10 parts chloro-phenanthrene (40% chlorine)

The ingredients are mixed by melting them together while stirring until a uniform composition is made.

The amounts of the ingredients may be changed as desired to make different impregnating compounds for different conditions and uses. The lower chlorinated diphenyls, acenaphthenes and phenanthrenes may be used, having a lower fire-resisting property but a greater flexibility, and lower melting point is imparted to the finished product. Increased flexibility of the halogenated cyclic compounds may also be obtained by increasing the amount of plasticizer. Waxes such as petroleum waxes, which decrease the tackiness or stickiness apt to result from using large amounts of the halogenated plasticizers where an extremely plastic or flexible material is desired, can be added, the waxes supplying some of the plasticity or flexibility while overcoming stickiness. Certain pitches such as the stearin and cottonseed pitches can likewise be included but all such additions, if of the combustible type, should be in small amounts, where the fireproofing property of the finished composition is important.

For impregnating the fabric insulation on electrical wires the compositions can be dyed or otherwise colored so that the several wires in a composite cable may easily be identified. When using the material for impregnating the fabric coating of a wire which has a rubber insulating coating under the fabric, an impregnating composition which has a low melting point should, in general, be used because if a high melting point material is used the heat which is necessary to melt the material for impregnating the fabric may cause the rubber to swell and otherwise deteriorate. For impregnating the fabric on such a rubber coated wire, a material similar to that of Formula #3 is recommended with several more parts of the diphenyl having 54% chlorine. When using the material on wires or cables, it is deemed preferable to apply sufficient of the material to not only impregnate the fabric but form a continuous layer on or in conjunction with, the fabric. This prevents the air from coming into contact with the rubber insulation to cause oxidation and cracking or other deterioration of the rubber. The continuous coating is particularly desirable where the wires or cables are used in places where there may be a crowd of persons and relatively little ventilation, for instance in a theatre or in a subway. In such places the danger to human life is not so much from actual fire as it is from the stampede which occurs when the insulation continues to smolder and give off fumes and smoke after the short circuit and the possibility of a general conflagration is past. Thorough impregnation of the fabric with the beforementioned materials prevents the fabric from smoldering and the continuous coating (with no cracks) prevents the access of air and thereby prevents smoldering of the rubber which may not be impregnated.

From the above description, the various uses of the invention will be seen and various modifications may be made. It is therefore to be understood that, although the particular and preferred form of the invention has been described, it is recognized that various modifications may be made, and it is therefore desired that the invention be construed as broadly as the claims taken in conjunction with the prior art may allow.

I claim:

1. Composition suitable for impregnating combustible and flexible substances such as textiles, paper and the like including a halogenated aromatic carbon ring compound having at least 10 carbon atoms and of a crystalline character and a plasticizer therefor comprising an amorphous halogenated aromatic carbon ring compound.

2. Composition suitable for impregnating combustible and flexible substances such as textiles, paper and the like including a halogenated aromatic carbon ring compound having at least 10 carbon atoms and of a crystalline character and an incombustible aromatic carbon ring plasticizer therefor.

3. Composition suitable for impregnating substances such as textiles, paper and the like including a crystalline halogenated aromatic carbon ring compound having at least 10 carbon atoms and a plasticizer therefor comprising a member of the group consisting of halogenated diphenyls, acenaphthenes and phenanthrenes.

4. Composition suitable for impregnating substances such as textiles, paper and the like including a crystalline halogenated aromatic carbon ring compound having more than 6 carbon atoms and a plasticizer therefor comprising a halogenated derivative of a member of the group consisting of diphenyls, acenaphthenes and phenanthrenes.

5. Composition suitable for impregnating substances such as textiles, paper and the like including a crystalline halogenated aromatic carbon ring compound having more than 6 carbon atoms and a plasticizer therefor comprising a halogenated diphenyl.

6. Composition suitable for impregnating substances such as textiles, paper and the like including a wax-like halogenated naphthalene and a plasticizer therefor comprising a halogenated diphenyl.

7. Composition suitable for impregnating substances such as textiles, paper and the like including a wax-like substance comprising principally tri- and tetra-chloronaphthalenes and a plasticizer therefor comprising a chlorinated diphenyl.

8. Composition suitable for impregnating substances such as textiles, paper and the like including a major proportion of a wax-like halogenated naphthalene and a minor proportion of a plasticizer therefor comprising a resin-like aromatic carbon ring compound.

9. Textile impregnated with a crystalline halogenated aromatic carbon ring compound plasticized with an amorphous halogenated aromatic carbon ring compound.

10. Covered wire having an inner conducting core and a cover impregnated with a chlorinated naphthalene plasticized with a chlorinated diphenyl.

11. In a method of flame-proofing an article, the step of impregnating the article with a crystalline halogenated aromatic carbon ring compound having at least 10 carbon atoms and an incombustible aromatic carbon ring plasticizer therefor.

12. Textile impregnated with halogenated naphthalene plasticized with a plasticizer including halogenated diphenyl.

13. Composition suitable for impregnating substances such as textiles, paper and the like including a member of the group consisting of halogenatted dicyclic aromatic carbon ring compounds of crystalline character and tricyclic aromatic carbon ring compounds of crystalline character, and a plasticizer therefor comprising an incombustible amorphous halogenated aromatic carbon ring compound.

14. Fibrous material carrying a composition including a halogenated aromatic carbon ring compound having at least 10 carbon atoms and a member of the group consisting of halogenated diphenyls, acenaphthenes and phenanthrenes.

15. Flame resistant textile comprising a textile base carrying a composition including a member of the group consisting of halogenated acenaphthenes and phenanthrenes.

16. Flame resistant textile comprising a textile base carrying a composition including a halogenated derivative of a member of the group consisting of acenaphthenes and phenanthrenes.

ERNEST R. HANSON.